United States Patent [19]

Egan et al.

[11] Patent Number: 4,592,120

[45] Date of Patent: Jun. 3, 1986

[54] METHOD FOR MANUFACTURING A MULTIPLE PROPERTY INTEGRAL TURBINE WHEEL

[75] Inventors: Michael J. Egan, Milford; Gary J. Quill, Birmingham, both of Mich.

[73] Assignee: Williams International Corporation, Walled Lake, Mich.

[21] Appl. No.: 466,167

[22] Filed: Feb. 14, 1983

[51] Int. Cl.⁴ ............................................. B23P 15/04
[52] U.S. Cl. ................................. 29/156.8 R; 29/418; 29/423; 29/DIG. 4; 29/DIG. 5; 164/100; 164/101; 228/194; 228/195; 416/213 R; 416/244 A
[58] Field of Search ............... 29/156.8 R, 156.8 CF, 29/423, 418, DIG. 4, DIG. 5; 164/100, 101, 72, 74; 228/194, 195; 416/213 R, 213 A, 244 A, 241 A

[56] References Cited

U.S. PATENT DOCUMENTS

| | | | |
|---|---|---|---|
| 1,621,002 | 3/1927 | Dimberg | 29/156.8 R |
| 2,654,143 | 10/1953 | Hoesch et al. | 29/156.8 R |
| 4,008,052 | 2/1977 | Vishnevsky et al. | 228/193 X |
| 4,063,939 | 12/1977 | Weaver et al. | 29/156.8 R X |
| 4,096,615 | 6/1978 | Cross | 29/156.8 R |
| 4,152,816 | 5/1979 | Ewing et al. | 29/156.8 R |
| 4,270,256 | 6/1981 | Ewing | 228/193 X |

FOREIGN PATENT DOCUMENTS 2607684 2/1976 Fed. Rep. of Germany ...... 164/100

Primary Examiner—Charlie T. Moon
Assistant Examiner—Ronald S. Wallace
Attorney, Agent, or Firm—Lyman R. Lyon

[57] ABSTRACT

The disclosure relates to a process for the fabrication of low cost dual property turbine rotors having blades that are diffusion bonded to a blade ring that is simultaneously diffusion bonded to a central hub.

2 Claims, 8 Drawing Figures

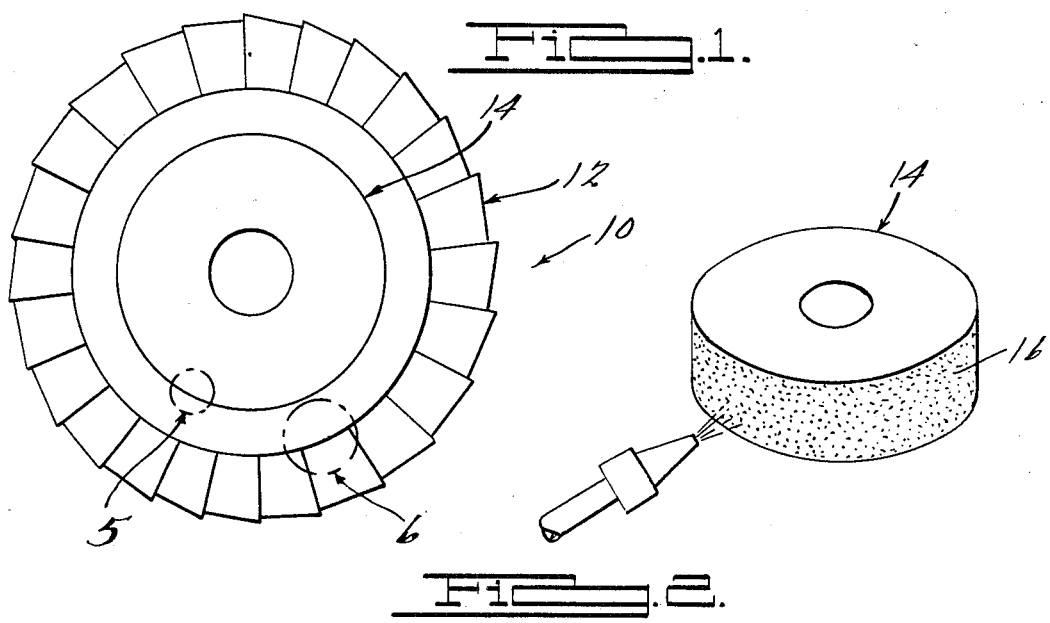
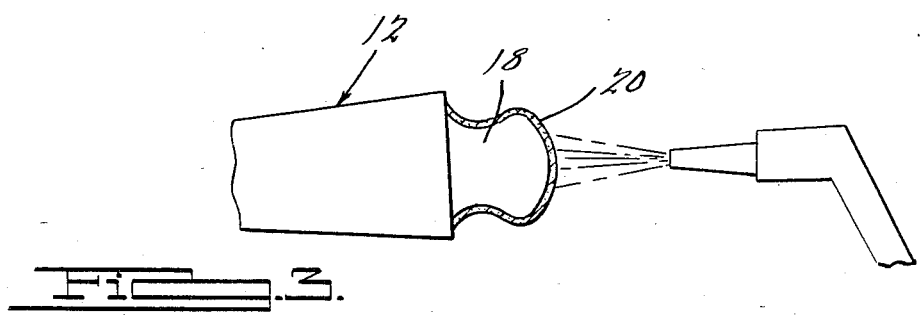
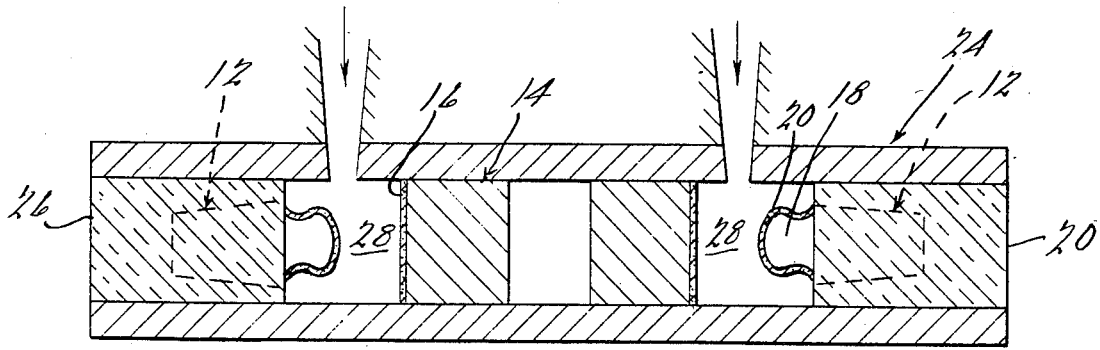
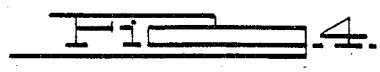

METHOD FOR MANUFACTURING A MULTIPLE PROPERTY INTEGRAL TURBINE WHEEL

BACKGROUND OF THE INVENTION

Power and fuel efficiency of a gas turbine engine are a function of the inlet temperature of the combustion gases to the turbine which is generally maximized consistent with turbine and nozzle structural integrity. For example, the maximum turbine rotor inlet temperature exhibited in current state-of-the-art uncooled metal turbine rotors is approximately 2000° F. Increasing the turbine rotor inlet temperature above 2000° F. requires the use of advanced super alloy blade materials which are generally not compatible with the mechanical properties of the rotor disk.

A solution to this incompatibility problem is to adopt a dual-property approach to the fabrication of the turbine rotor. In large gas turbines, where size and complexity constraints are not acute, this is accomplished by using discrete blades of a high rupture strength material mechanically attached to a high burst strength disk. However, the physical size, cost, and complexity associated with this dual-property rotor concept have precluded its use in small, lightweight gas turbine engines.

SUMMARY OF THE INVENTION

The turbine wheel of the instant invention is a relatively simple, low cost multiple property integral turbine rotor for use in small gas turbine engines. The rotor has discrete, high rupture strength blades permanently bonded to a single or multiple layer high burst strength alloy hub.

More specifically, individual turbine blades are fabricated, for example, from a single crystal alloy, oxide dispersion strengthened alloy, rapid solidification rate alloy, etc. Thereafter, the root and dovetail of each blade are coated with a diffusion bonding material after which the blades are placed in an assembly fixture comprising inner and outer rings and the annulus therebetween is packed with resin sand or ceramic slurry. After hardening, the annular core is stripped from the fixture, leaving a free standing sand or ceramic core with exposed blade dovetails. The core and blades are placed in a rotor ring mold and the ring is cast about the blade dovetails and a high strength hub having a diffusion bonding coating on the periphery thereof. The assembly is then diffusion bonded and subjected to a hot isostatic press cycle to complete the bond.

BRIEF DESCRIPTION OF THE DRAWINGS

FIG. 1 is a plan view of a completed turbine wheel.
FIG. 2 is a view of a turbine wheel hub.
FIG. 3 is a view of a coated turbine wheel blade.
FIG. 4 is a view of a mold for casting a blade ring to the turbine blades and wheel hub.

DETAILED DESCRIPTION OF THE PREFERRED EMBODIMENT OF THE INVENTION

Figure 5:
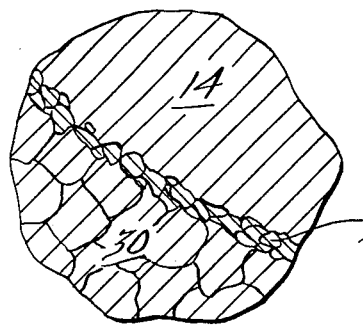
FIG. 5 is a view taken within the circle 5 of FIG. 1.

As seen in FIG. 1 of the drawings, a turbine wheel 10 comprises a plurality of blades 12 which are fabricated from a high temperature material by known fabrication processes. Examples of such materials are single crystals of CMSX 2, MarM 247, or NASAIR 100. The blades 12 can be directionally solidified eutectics, directionally solidified castings, or oxide disperson stengthened alloys.

As seen in FIG. 2, a hub 14 of, for example, a powder metal superalloy such as Astroloy is manufactured by conventional means. The outer periphery of the hub 14 is prepared for diffusion bonding by plasma spraying an activated diffusion bond (ADB) alloy coating 16 thereto or, alternatively, by vacuum sintering a thin coat of ADB alloy and binder on the outer periphery.

As seen in FIG. 3, a dovetail root portion 18 of each blade 12 is coated by a plasma sprayed coating 20 of activated diffusion bond alloy in the same manner as the hub 14. The material selected for the ADB coating, the coating thickness, and the method of coating are well known in the art. The coating is utilized to effect a diffusion bond between components of the turbine wheel, as will be described.

As seen in FIG. 4, a mold or fixture 24 facilitates assembly of a ceramic or resin sand core ring 26, with the hub 14. The core ring 26 holds the blades 12 in a desired array and, in combination with the fixture 24, defines a mold cavity 28 in preparation for the bi-casting process which will result in the cast turbine wheel 10.

A super heated melt is vacuum poured into the fixture 24 to case a blade ring 30 and to effect melting of the ADB alloy coatings 16 and 20 thereby forming a metallurgical bond between the blades 12, hub 14, and ring 30 as the entire assembly slowly cools. In this manner, an integral, multiple alloy turbine wheel is formed.

The structural elements that coact in the bonding process are the blades 12, the superalloy hub 14, and the blade ring 30, all of which have a melting point of approximately 2500° F., and the bond activators 16 and 20 on the hub 14 and blades 12, respectively, which have a melting point of approximately 2000° F. When the aforesaid combination is heated above 2200° F. in the mold 24 the superalloy hub/blade-ring/blade combination is conditioned for diffusion bonding. The bond activators 16 and 20 (Ni-Cr-B-Si) melt, due to the fact that Boron has a relatively low melting point, and wet the outside diameter of the hub 14 and outside surface of the dovetail 18 of the blades 12. As time progresses, and the blade ring 30 solidifies, Boron and Silicon migrate into the hub 14, blade ring 30 and blades 12 in the solid state. Because Boron imparts the relatively low melting point to the bond activator, migration thereof raises the melting point of the bond activator layers 16 and 20 and lowers the melting point of the hub 14, blade ring 30 and blades 12 until equilibrium is reached at approximately 2200° F. After cooling, the completed turbine wheel is finish machined and conditioned for assembly with mating turbine engine components.

Figure 6:
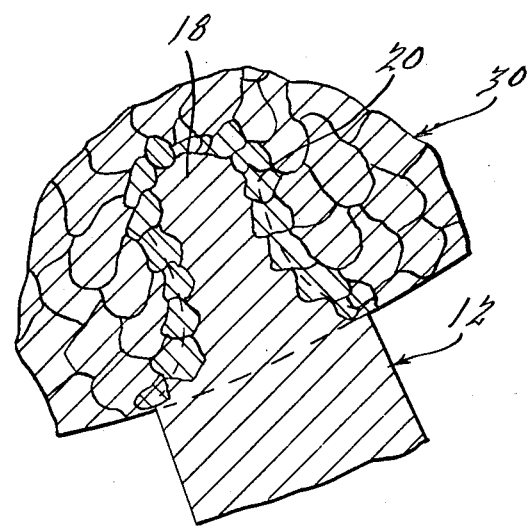
FIG. 6 is a view taken within the circle 6 of FIG. 1.

As seen in FIGS. 5 and 6, the bi-cast blade ring 30 is metallurgically bonded to the hub 14 by the diffusion bond layer 16 and to the dovetails 18 of the blades 12 by the diffusion bond layer 20, respectively.

Figure 7:
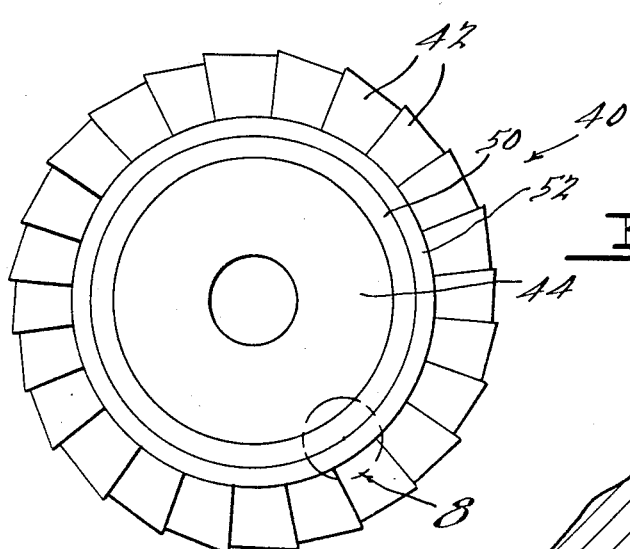
FIG. 7 is a view of a modified turbine wheel.
Figure 8:
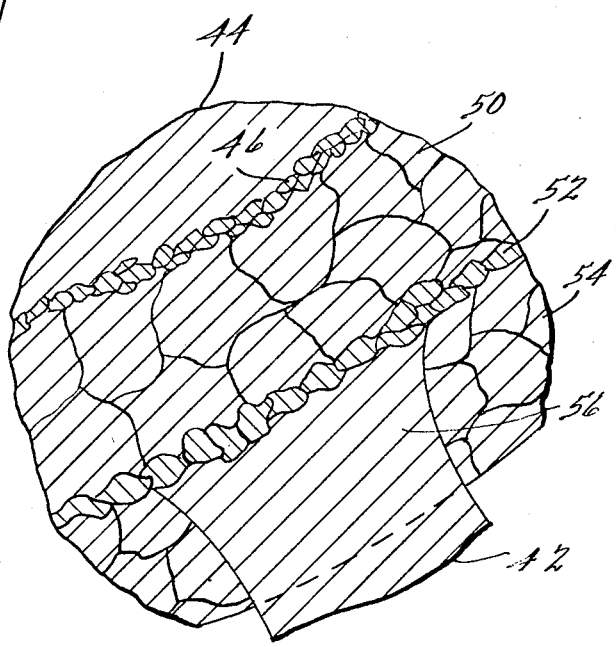
FIG. 8 is a view taken within the circle 8 of FIG. 7.

As seen in FIGS. 7 and 8 of the drawings, a modified turbine wheel 40 comprises a plurality of blades 42 fabricated from a high temperature material by known fabrication processes as discussed hereinbefore. A hub 44 of, for example, a powder metal superalloy such as Astroloy, is manufactured by conventional means. The outer periphery of the hub 44 is prepared for diffusion bonding by plasma spraying an ADB alloy coating 46 thereon or, alternatively, by vacuum sintering a thin coat of ADB alloy and binder on the outer periphery thereof.

In accordance with one feature of this embodiment of the invention, a cast intermediate ring 50 is telescoped over the hub 44. The exterior periphery of the intermediate ring 50 is prepared for diffusion bonding by a bond activator coating 52 in the same manner as the hub 44. The intermediate ring 50 is subsequently metallurgically bonded to the hub 44 and to a cast blade ring 54 as will be described.

As seen in FIG. 8, the blade ring 54 is bicast about dovetails 56 of the blades 42 in the manner discussed hereinbefore. In this embodiment, however, the inner periphery of the blade ring 54 and dovetails 56 of the blades 42 are machined to a diameter complementary to the outside diameter of the intermediate ring 50 so as to be telescoped thereover.

The structural elements that coact in the bonding process of this embodiment are the inner periphery of the blades 42, the blade ring 54, the intermediate ring 50 and the superalloy hub 44, all of which have a melting point of approximately 2500° F., in conjunction with bond activators 46 and 52 on the hub 44 and intermediate ring 50, respectively. As before, the bond activators 46 and 52 have a melting point of approximately 2000° F. When the aforesaid combination is heated above 2200° F. the superalloy hub/intermediate ring/blade ring/blade combination is conditioned for diffusion bonding. The bond activator 46 melts and wets the outside diameter of the hub 44 and inner surface of the intermediate ring 50. Similarly, the bond activator 52 on the intermediate ring 50 melts and wets the inner surface of the blade ring 54 and blade dovetails 56. As time progresses, Boron and Silicon migrate into the hub 44, intermediate ring 50, blade ring 54, and blades 42 in the solid state. Because Boron imparts a relatively low melting point to the bond activator, migration thereof raises the melting point of the bond activator and lower the melting point of the hub 44, intermediate ring 50, blade ring 54 and blades 42 until equilibrium is reached. When the equilibrium point of 2200° F. is reached, the entire assembly solidifies. After cooling, the completed turbine wheel is finish machined and conditioned for assembly with mating turbine engine components.

It is to be noted that, in accordance with yet another feature of this embodiment of the invention, the blade ring 54 retains the sides of the dovetails 56 of the blades 42 by mechanical entrapment. Metallurgical bonding of the radially inner surface of the dovetails 56 on the blades 42 takes place only to the intermediate ring 50 resulting in a desired dampening characteristic in certain applications.

While the preferred embodiment of the invention has been disclosed, it should be appreciated that the invention is susceptible of modification without departing from the scope of the following claims.

We claim:

1. A method of making a turbine rotor comprising the steps of
   coating the outer periphery of a metallic hub with a diffusion bonding material,
   supporting a plurality of metallic turbine blades having dovetails on the root portions thereof, respectively, in a circumferentially spaced array in a frangible core ring, the spaces between said blades radially outwardly of the root portions thereof being filled with said frangible material but said dovetails being exposed,
   coating the exposed dovetails of said blades with a diffusion bonding material,
   casting a metallic blade retainer ring about said dovetails and into contact with said hub to fully encompass said dovetails and simultaneously effect diffusion of said bonding material into the dovetails of said blades and into the periphery of said hub, and
   removing said frangible core ring from about said blades.

2. A method of making a turbine rotor comprising the steps of
   supporting a plurality of metallic turbine blades having dovetails on the root portions thereof, respectively, in a circumferentially spaced array in a frangible core ring, the spaces between said blades radially outwardly of the root portions thereof being filled with said frangible material but said dovetails being exposed,
   coating a metallic blade retainer ring about said dovetails to fully encompass said dovetails and form a retainer ring/blade assembly,
   removing said frangible core ring from about said blades,
   machining the radially inner portion of said retainer ring/blade assembly to form a cylindrical internal surface comprising exposed portions of said retainer ring and exposed portions of the radially inner ends of said blade dovetails,
   providing a hub having a radially outer cylindrical surface of a diameter acceptable within said retainer ring/blade assembly in a close fit relationship,
   coating one of said cylindrical surfaces with a diffusion bonding material,
   telescoping said machined retainer ring/blade assembly over said hub, and
   heating the hub and retainer ring/blade assembly to a temperature sufficient to effect diffusion bonding between said hub and retainer ring and between said hub and the machined portion only of said blade dovetails.

* * * * *